US 7,818,550 B2

(12) United States Patent
Vaden

(10) Patent No.: US 7,818,550 B2
(45) Date of Patent: Oct. 19, 2010

(54) METHOD AND APPARATUS FOR DYNAMICALLY FUSING INSTRUCTIONS AT EXECUTION TIME IN A PROCESSOR OF AN INFORMATION HANDLING SYSTEM

(75) Inventor: Michael Thomas Vaden, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 11/781,601

(22) Filed: Jul. 23, 2007

(65) Prior Publication Data
US 2009/0031120 A1     Jan. 29, 2009

(51) Int. Cl.
*G06F 9/00* (2006.01)
*G06F 7/38* (2006.01)

(52) U.S. Cl. ............................ 712/226; 708/523
(58) Field of Classification Search ................. 712/226; 708/523
See application file for complete search history.

(56) References Cited

U.S. PATENT DOCUMENTS

| | | | |
|---|---|---|---|
| 5,303,356 A | 4/1994 | Vassiliadis | |
| 5,504,932 A | 4/1996 | Vassiliadis | |
| 5,732,234 A | 3/1998 | Vassiliadis | |
| 5,819,067 A * | 10/1998 | Lynch | 703/22 |
| 5,872,948 A * | 2/1999 | Mallick et al. | 712/214 |
| 5,892,698 A * | 4/1999 | Naffziger | 708/501 |
| 6,571,266 B1 * | 5/2003 | Bass | 708/501 |
| 6,813,626 B1 | 11/2004 | Chng | |
| 6,889,318 B1 * | 5/2005 | Wichman | 712/226 |
| 7,225,323 B2 | 5/2007 | Siu | |
| 2004/0128483 A1 * | 7/2004 | Grochowski et al. | 712/217 |
| 2008/0133880 A1 * | 6/2008 | Pinto et al. | 712/24 |

OTHER PUBLICATIONS

Chen—"Fusing Instructions to Reduce Resource Usage in If-Converted Regions", 5th Workshop on EPIC Architectures and Compiler Technology (Mar. 26, 2006).
Gelas—"Intel Core versus AMD's K8 Architecture", www.anandtech.com (May 1, 2006).
Gran—"An Enhancement for a Scheduling Logic Pipelined Over Two Cycles", IEEE (2006).
Hu—"Using Dynamic Binary Translation to Fuse Dependent Instructions", Proceedings of the International Symposium on Code Generation and Optimization, IEEE(2004).

(Continued)

*Primary Examiner*—Jacob Petranek
(74) *Attorney, Agent, or Firm*—Diana Gerhardt; Mark P Kahler

(57) ABSTRACT

One embodiment of a processor includes a fetch stage, decoder stage, execution stage and completion stage. The execution stage includes a primary execution stage for handling low latency instructions and a secondary execution stage for handling higher latency instructions. A detector determines if an instruction is a high latency instruction or a low latency instruction. If the detector also finds that a particular low latency instruction is dependent on, and destructive of, a corresponding high latency instruction, then the secondary execution stage dynamically fuses the execution of the low latency instruction together with the execution of the high latency instruction. Otherwise, the primary execution stage handles the execution of the low latency instruction.

12 Claims, 6 Drawing Sheets

OTHER PUBLICATIONS

Jackson—"Inside Intel's Core Duo processors", Personal Computer World (Sep. 11, 2006).

Petric—"Reno: A Rename-Based Instruction Optimizer", (Dec. 9, 2004).

Pochinsky—"The Blue Gene, GCC and Lattice QCD: A Case Study", Journal of Physics (2006).

Wechsler—"Inside Intel® Core™ Microarchitecture: Setting New Standards for Energy-Efficient Performance", Technology @ Intel Magazine (Mar. 2006).

* cited by examiner

FIG. 3A
(PRIOR ART)

|  | CYCLE 1 | CYCLE 2 | CYCLE 3 | CYCLE 4 | CYCLE 5 | CYCLE 6 | CYCLE 7 |
|---|---|---|---|---|---|---|---|
| OPERAND READ | mullw |  |  |  | add |  |  |
| EXECUTE |  | mullw | mullw | mullw | mullw | add |  |
| WRITEBACK |  |  |  |  |  | mullw | add |
|  | LATENCY FOR OPERATION IS 7 CYCLES ||||||||

FIG. 3B
(PROCESSOR 100)

|  | CYCLE 1 | CYCLE 2 | CYCLE 3 | CYCLE 4 | CYCLE 5 | CYCLE 6 | CYCLE 7 |
|---|---|---|---|---|---|---|---|
| OPERAND READ | mullw |  | add |  |  |  |  |
| EXECUTE |  | mullw | mullw | mullw add | mullw add |  |  |
| WRITEBACK |  |  |  |  |  | mullw add |  |
|  | LATENCY FOR OPERATION IS 6 CYCLES ||||||||

METHOD AND APPARATUS FOR DYNAMICALLY FUSING INSTRUCTIONS AT EXECUTION TIME IN A PROCESSOR OF AN INFORMATION HANDLING SYSTEM

TECHNICAL FIELD OF THE INVENTION

The disclosures herein relate generally to information handling systems, and more particularly, to an information handling system that employs a processor that combines instructions to improve performance.

BACKGROUND

Modern information handling systems (IHSs) often employ processors that include multiple stages that together form a pipeline. For example, a pipelined processor may include a fetch unit, a decoder, an instruction queue, a number of execution units, and a completion or writeback unit. The fetch unit fetches instructions from a memory cache or system memory to provide an instruction stream. The decoder decodes the fetched instructions into opcodes and operands. An instruction queue or dispatch unit sends decoded instructions to appropriate execution units for execution. A completion or writeback unit writes the completed results back to an appropriate processor register or memory. While one stage of the pipelined processor performs a task on one instruction, another stage performs a different task on another instruction. For example, the fetch unit fetches a first instruction from an instruction cache. Next, while the decoder decodes the fetched first instruction, the fetch unit fetches another instruction from the instruction cache. Breaking instruction handling into separate tasks or stages in this manner may significantly increase processor performance.

Some instructions take longer to execute than others. A single cycle instruction typically takes one clock cycle to execute in an execution stage of a pipeline. In contrast, a multi-cycle instruction takes multiple clock cycles to execute in the execution stage of the pipeline. For this reason, a single clock cycle instruction exhibits relatively low latency, while a multi-cycle instruction exhibits relatively high latency in comparison. When a processor dispatches a high latency instruction, such as a multiply instruction (e.g. "mullw" or "mulld") to an execution unit, other instructions or operations that depend on the high latency instruction may stall in the pipeline until the high latency instruction completes.

To increase performance, some processors fuse or merge certain instructions together to form new instructions in the processor's instruction set. For example, the Power PC architecture employs a floating point multiply add instruction that fuses an add instruction to a floating point multiply instruction. Unfortunately, however, adding new instructions to an existing architecture consumes additional opcode space. Such new instructions may also force all implementations of the processor to support the structures necessary for executing a fused-op. This is not desirable for architectures that attempt to span a product range from embedded applications at one end to high-end servers at the other. Fusing instructions near the beginning of the pipeline may complicate both the processor's control hierarchy and logic structures. This approach may also require that an instruction queue in the pipeline handle more operands than otherwise required.

What is needed is a processor apparatus and methodology that addresses the instruction handling problems above.

SUMMARY

Accordingly, in one embodiment, a method is disclosed for processing an instruction stream. The method includes fetching, by a fetch stage, a stream of instructions from an instruction source, thus providing a fetched stream of instructions. The method also includes decoding, by a decoder, the fetched stream of instructions, thus providing a decoded stream of instructions. The method further includes detecting, by a detector, a first latency instruction in the decoded stream of instructions followed by a second latency instruction, the second latency instruction exhibiting a latency less than the first latency instruction exhibits, the detector detecting if the second latency instruction is dependent on the first latency instruction and destructive of a result of the first latency instruction. The method still further includes dynamically fusing, subsequent to the detecting step, the second latency instruction with the first latency instruction to execute the second latency instruction with the first latency instruction if the detector detects that the second latency instruction is dependent on the first latency instruction and is destructive of the result of the first latency instruction.

In another embodiment, a processor is disclosed for processing an instruction stream. The processor includes a fetch stage that fetches a stream of instructions from an instruction source, thus providing a fetched stream of instructions. The processor also includes a decoder stage, coupled to the fetch stage, that decodes the fetched stream of instructions, thus providing a decoded stream of instructions. The processor further includes a detector, responsive to the decoded stream of instructions, that detects a first latency instruction in the decoded stream of instructions followed by a second latency instruction, the second latency instruction exhibiting a latency less than the first latency instruction exhibits, the detector detecting if the second latency instruction is dependent on the first latency instruction and destructive of a result of the first latency instruction. The processor still further includes an execution stage, that executes the first latency instruction and the second latency instruction, the execution stage dynamically fusing the second latency instruction with the first latency instruction to execute the second latency instruction with the first latency instruction if the detector detects that the second latency instruction is dependent on the first latency instruction and is destructive of the result of the first latency instruction. In one embodiment, the result of the second latency instruction is available at the same time that the result of the first latency instruction would have been available if the first and second latency instructions were not fused.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3A is a representation of the pipeline of a conventional processor that handles a multiply low word (mullw) instruction and an add instruction.

FIG. 3B is a representation of the pipeline of the disclosed processor that handles a multiply low word (mullw) instruction and an add instruction.

DETAILED DESCRIPTION

Figure 1:
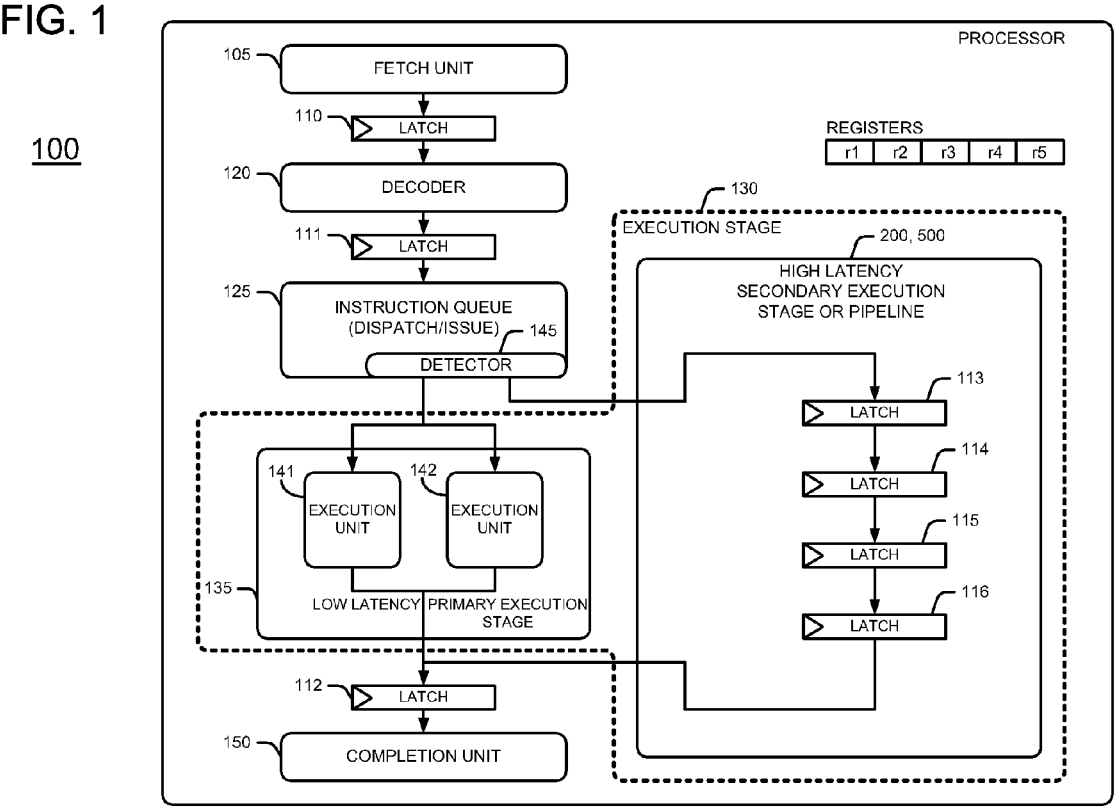
FIG. 1 shows a block diagram of one embodiment of the disclosed processor.

FIG. 1 depicts one embodiment of the disclosed processor 100 that dynamically fuses particular instructions at execution time. Processor 100 includes a fetch unit 105 that fetches a stream of instructions from a memory (not shown) such as a system memory or instruction cache. Instructions in the instruction stream include opcodes and operands. Fetch unit 105 is the first stage of the pipeline of processor 100. Fetch unit 105 couples to a latch stage 110 through which the fetched instruction stream passes on its way to subsequent stages of the processor's pipeline. Latch stage 110 corresponds to a clock boundary within the processor. Processor 100 further includes other latch stages 111, 112, 113, 114, 115 and 116 that correspond to respective clock boundaries in other stages of the processor's pipeline.

An instruction decoder 120 couples to the latch stage 110 to receive the fetched instruction stream from fetch unit 105. Decoder 120 decodes the fetched instruction stream thus providing a decoded instruction stream to latch stage 111. Decoder 120 is another stage of the pipeline of processor 100. Instruction decoder 120 decodes fetched instructions into their constituent opcodes and operands.

An instruction queue 125 couples to latch stage 111 to receive decoded instructions therefrom. Instruction queue 125 couples to execution stage 130 to dispatch or issue instructions thereto for execution. Execution stage 130 is another pipeline stage of processor 100. Execution stage 130 includes two paths that a particular decoded instruction may enter for execution depending on whether the particular decoded instruction is a high latency instruction or a low latency instruction, and other factors. More particularly, execution stage 130 includes low latency primary execution stage 135 and high latency secondary execution stage 200, 500. Low latency primary execution stage 135 and high latency secondary execution stage 200 are each paths or portions of execution stage 130.

Some instructions may execute in a single clock cycle, whereas other instructions may take several cycles in execution stage 130 to execute. For example, an "add" instruction is a low latency instruction that may execute in a single clock cycle within execution stage 130. However, a multiply instruction such as a multiply low word "mullw" instruction may take multiple clock cycles within execution stage 130 to execute. Such an instruction is thus a multi-cycle instruction. In execution stage 130, low latency primary execution stage 135 executes low latency instructions and high latency secondary execution stage 200, 500 executes high latency instructions under certain conditions. Low latency primary execution stage 135 includes representative execution units 141 and 142 that handle execution of normal instructions that exhibit low latency, such as instructions that execute in an execution stage in one clock cycle. In one embodiment, high latency instructions are those instructions that execute in an execution stage in multiple clock cycles, namely more than one clock cycle. In actual practice, processor 100 may include more execution units than shown in FIG. 1.

Instruction queue 125 dispatches or issues instructions to either low latency primary execution stage 130 or high latency secondary execution stage 200, 500 depending on the result of instruction testing by detector 145. In this particular embodiment, detector 145 is in instruction queue 125. However, in other embodiments, other stages of the pipeline may include detector 145. For example, decoder stage 120 may include detector 145. Detector 145 monitors decoded instructions in the decoded instruction stream to determine those instructions that exhibit low latency and those instructions that exhibit high latency. Detector 145 also determines if a particular low latency instruction is dependent on, and destructive of, a result of a corresponding high latency instruction, as explained below. Consider the two instructions in Table 1 below:

TABLE 1 mullw r5, r1, r2
add   r5, 0x4(r5)

The mullw instruction takes multiple clock cycles in the execution stage to execute, for example 4 or more cycles. Thus, mullw is an example of a high latency instruction. In contrast, the add instruction typically takes one clock cycle to execute in an execution stage. Thus, the add instruction is an example of a low latency instruction. In one embodiment, a high latency instruction exhibits a larger latency or consumes a greater number of clock cycles in execution than a low latency instruction. In the example of Table 1, the mullw instruction multiplies the value in register r1 by the value in register r2 and places the result in register r5. The add instruction adds the value in register r5, namely the result of the multiply instruction mullw, to the hexadecimal value for 4, and then places the resultant sum in register r5. In this example, the add instruction is dependent on the multiply instruction because the add instruction depends on the result of the multiply instruction to determine the sum of register r5 and hex 4. Moreover, in this example, the add instruction is destructive of the multiply instruction because the add instruction writes its result in register r5, thus destroying the product result of the previous mullw instruction in register r5.

In one embodiment, detector 145 tests each instruction to determine if the instruction is a low latency instruction (such as an "add") that is both dependent on, and destructive of, another high latency instruction (such as "mullw"). Instruction queue 125 dispatches instructions that exhibit high latency, such as "mullw", to high latency secondary execution stage 200, 500. In one embodiment, high latency secondary execution stage 200 executes all high latency instructions. However, low latency instructions may take one of two different paths through execution stage 130, namely through low latency primary execution stage 135 or high latency secondary execution stage 200, 500.

Figure 2:
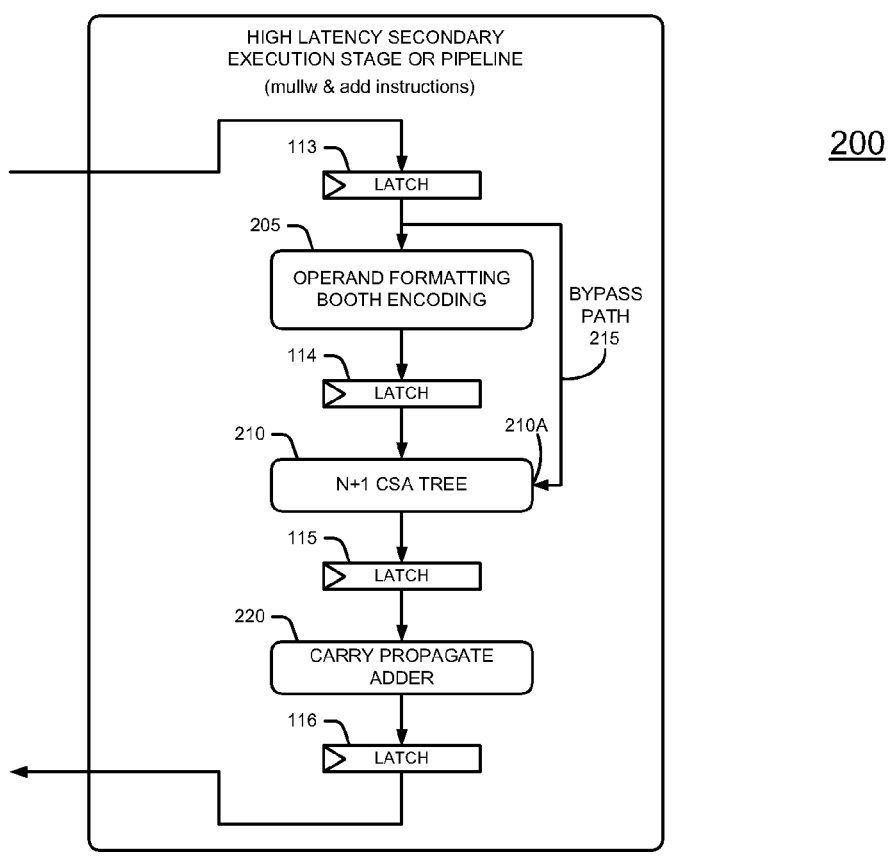
FIG. 2 shows a block diagram of a high latency secondary execution stage or pipeline that the disclosed processor may employ.

When the detector 145 detects a low latency instruction that is not both dependent on, and destructive of, another high latency instruction, then instruction queue 125 dispatches or issues that low latency instruction to low latency primary execution stage 135 for execution thereby. In contrast, if detector 145 detects a low latency instruction that is both dependent on, and the destructive of, another high latency instruction, then instruction queue 125 dispatches or issues that low latency instruction to high latency secondary execution stage 200, 500 for execution thereby. In that case, high latency secondary execution stage 200, 500 dynamically fuses the low latency instruction to the high latency instruction on which it depends such that secondary execution stage 200, 500 executes both instructions at substantially the same time. In other words, secondary execution stage 200, 500 processes the low latency instruction as part of processing the high latency instruction in one embodiment. For convenience, FIG. 1 shows high latency secondary execution stage 200, 500 with latches 113, 114, 115, 116 to represent the multiple clock cycles that execution stage 200, 500 consumes while executing high latency instructions. More detail with respect to other structures in high latency secondary execution stage 200, 500 is provided below FIG. 2 shows a block diagram of a representative high latency secondary execution stage 200 that processor 100 may employ to process high latency and some low latency instructions. Input latch 113 of execution stage 200 couples to instruction queue 125 of FIG. 1. Input latch 113 receives both high latency instructions (such as "mullw") and low latency instructions (such as "add") that depend on, and are destructive of, previously received high latency instructions. In the example of Table 1, the "add" instruction is dependent on, and destructive of, the multiply instruction, "mullw". The multiply instruction is effectively a series of add operations. To fuse and execute the multiply and add instructions together, high latency secondary execution pipeline 200 effectively executes the multiply instruction as a number N of add instructions that the multiply instruction specifies plus 1 more add instruction, namely the add instruction of Table 1. In other words, high latency secondary execution stage 200 executes N+1 add operations to execute the multiply and add instructions of Table 1, thus dynamically fusing these two instructions together on the fly.

In more detail, to attain this dynamic fusing of the high latency and low latency instructions, high latency secondary execution stage 200 includes hardware for this purpose. More particularly, execution stage 200 includes an operand formatting and Booth encoding stage 205 that couples to input latch stage 113. Stage 205 formats the operands of the multiply instruction as the multiply opcodes specify. This formatting operation may include an operand extension with 0's or sign bits to convert the input operand to the appropriate size of the multiplier. Stage 205 also performs Booth encoding on the multiply instruction "mullw". Booth encoding simplifies the multiply operation that the multiply instructions specifies. Booth encoding enables the high latency secondary execution stage 200 to perform a divide by 2 operation on the total number of partial products that stage 200 sums together to perform a multiply operation. In a case where the multiply instruction specifies a 64 bit multiplier that corresponds to 64 partial products to be summed, Booth encoding reduces the number of necessary partial products to 32. Stage 205 sends formatted, Booth encoded partial products to latch stage 114. Latch stage 114 is a clock boundary in the pipeline that high latency secondary execution stage 200 forms.

High latency secondary execution stage 200 also includes an N+1 carry save adder (CSA) tree stage 210 that couples to latch stage 114. At a high level, CSA tree stage 210 computes the sum bit of two inputs and a carry bit for those same two inputs. In CSA tree stage 210, there is no propagation of the carry from one bit to the next bit and, for this reason, CSA tree stage 210 produces two numbers as outputs, namely a sum bit vector and a carry bit vector. These two numbers are combinable with other CSAs to compress N partial products down to two vectors that execution stage 200 adds together to obtain the true sum of all of the partial products. In more detail, CSA tree stage 210 includes one more input 210A than a CSA tree stage would ordinarily require for a given multiplier and operand size. This additional input 210A receives the operand of the low latency "add" instruction for execution at the same time that stage 200 executes the high latency "mullw" multiply instruction. High latency secondary execution stage 200 includes a bypass path 215 that supplies the low latency "add" instruction directly to N+1 CSA tree 210 without passing through operand formatting and Booth encoding stage 205. The output of N+1 CSA tree 210 provides two numbers to latch stage 115. A carry propagate adder 220 couples to latch stage 115 to receive the two numbers that N+1 CSA tree 210 generates. Carry propagate adder 220 adds these two numbers together to finish the fused execution of the low latency add instruction together with the high latency multiply instruction. Latch stage 116 couples to carry propagate adder 220 to receive the combined result of the multiply and add instructions. The output of latch stage 116 couples back to the output of low latency primary execution stage 135 and to latch stage 112 as shown in FIG. 1. Completion unit 150 couples to the output of latch stage 112 to store the result of the dynamically fused high latency multiply instruction and the low latency add instruction in the appropriate register, r5, of processor 100. Note that in this case, processor 100 provides dynamic fusing when a low latency instruction is dependent on, and destructive of, an earlier dispatched or issued high latency instruction.

Another term for a low latency instruction is a normal latency instruction. For example, an add instruction typically takes one clock cycle in the execute stage to execute once an instruction queue dispatches or issues the add instruction to an execution unit. A high latency instruction is an instruction that takes longer to execute in an execute stage once an instruction queue issues or dispatches the high latency instruction. A high latency instruction is a multi-cycle instruction.

FIG. 3A is a representation of the stages of a conventional processor pipeline as the processor executes a high latency instruction such as a "mullw" instruction and a dependent low latency instruction such as an "add" instruction. The conventional pipeline of FIG. 3A includes operand read, execute and writeback pipeline stages and depicts processing of the "mullw" and "add" instructions from clock cycle 1 to clock cycle 7. The latency for processing the "mullw" and "add" instructions in this conventional pipeline is 7 clock cycles from operand read to result writeback.

FIG. 3B is a representation of the stages of the disclosed processor pipeline shown while processor 100 executes a high latency instruction such as a "mullw" instruction and a low latency instruction such as an "add" instruction that is dependent on, and destructive of, the high latency instruction. The latency for processing the "mullw" and "add" instructions in the disclosed processor pipeline is 6 clock cycles from operand read to result writeback, an improvement of 1 clock cycle over the conventional pipeline of FIG. 3A. In the disclosed processor pipeline of FIG. 3B, completion unit 150 writes back the combined result of the multiply and add instructions from high latency secondary pipeline stage 200 on clock cycle 6. In contrast, the conventional pipeline of FIG. 3A writes back the multiply result in cycle 6 and writes back the add result in clock cycle 7, thus consuming one more clock cycle than the disclosed pipeline shown in FIG. 3B.

Figure 4:
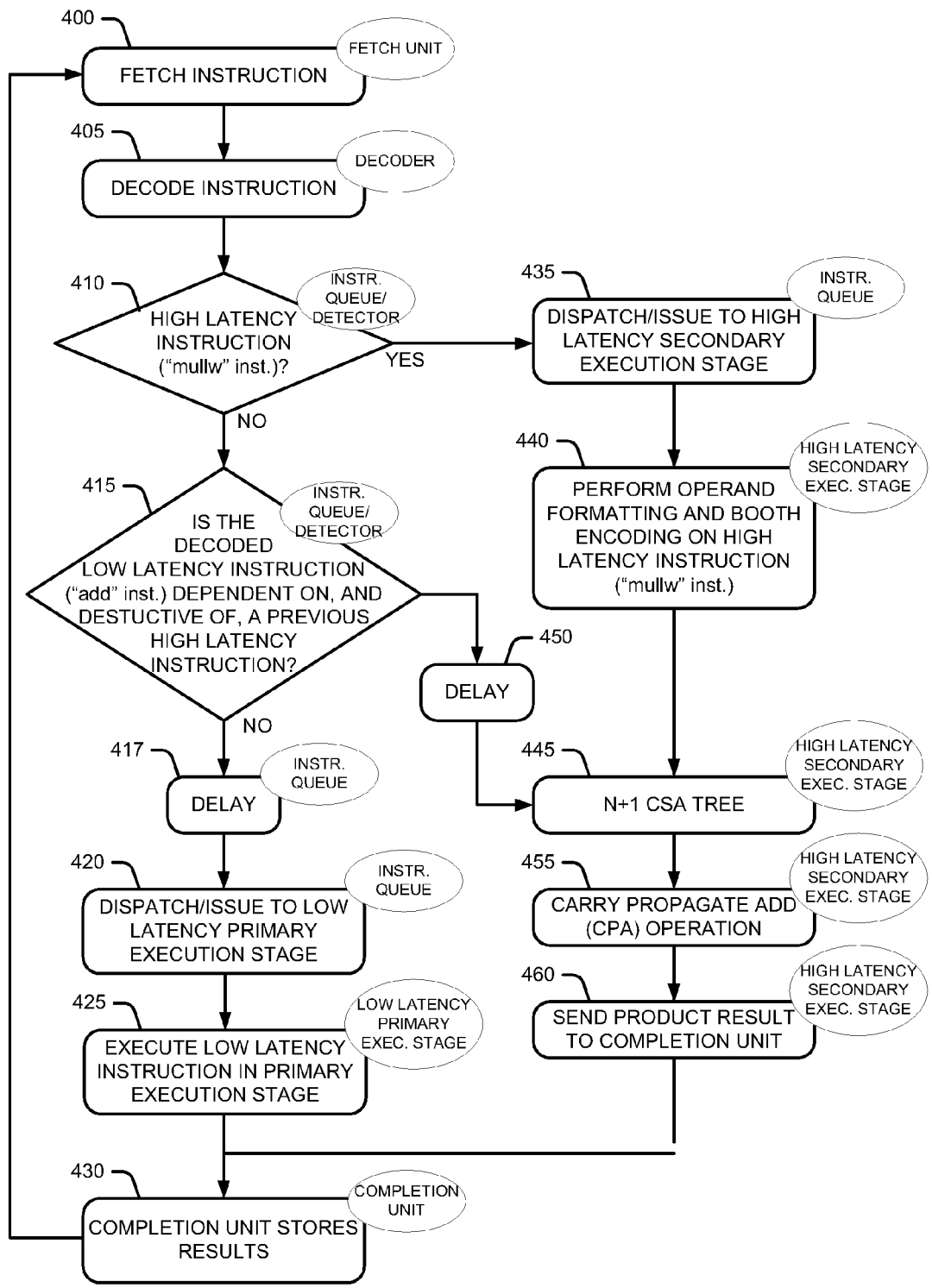
FIG. 4 is a flowchart that depicts process flow in the disclosed processor.

FIG. 4 is a flowchart that depicts process flow in the pipeline of processor 100. This flowchart considers the case where processor 100 processes a high latency instruction such as multiply instruction "mullw" and a low latency or normal latency instruction "add". Fetch unit 105 fetches a stream of instructions from a system memory or an instruction cache (not shown), as per block 400. Decoder 120 decodes the fetched instructions, as per block 405. Detector 145 performs a test to determine if a particular decoded instruction is a high latency instruction, for example "mullw", as per decision block 410. If detector 145 determines that the decoded instruction is not a high latency instruction, but rather the decoded instruction is a low latency "and", instruction then detector 145 performs an additional test at decision block 415. In decision block 415, detector 145 determines if the decoded low latency "add" instruction is dependent on, and destructive of, a previous high latency "mullw" instruction in the instruction stream. If the decoded low latency "add" instruction is not dependent on, and destructive of, a previous high latency "mullw" instruction, then after a delay in block 417 instruction queue 125 dispatches or issues this low latency "and" instruction to low latency primary execution stage 135 for execution, as per block 420. Low latency primary execution stage 135 executes the low latency "add" instruction, as per block 425. Completion unit 150 stores the result of the "add" operation in an appropriate register, as per block 430. Process flow then continues back to fetch instruction block 400. In actual practice, the fetching of instructions occurs continuously as processor 100 processes instructions through its pipeline stages.

Returning now to decision block 410, if detector 145 determines that a decoded instruction is a high latency "mullw" instruction, then instruction queue 125 dispatches or issues this high latency "mullw" instruction to high latency secondary execution stage 200 for execution, as per block 435. Operand formatting and Booth encoding stage 205 both formats and Booth encodes the high latency "mullw" instruction, as per block 440. In the event that detector 145 finds no low latency "add" instruction that is both dependent on, and destructive of, the high latency "mullw" instruction, then N+1 CSA tree 210 conducts a CSA tree operation to reduce the number of partial products that high latency secondary execution stage 200 sums together as part of executing the high latency "mullw" multiply instruction. Because there is no low latency "add" instruction, instruction queue 125 does not send a low latency "add" instruction to N+1 CSA tree 210 for insertion therein via fusing as part of the multiply operation. In this case, carry propagate adder (CPA) 220 performs a carry propagate add operation to sum the intermediate results it receives from N+1 CSA tree 210, as per block 455. Carry propagate adder 220 sends the product result of the now fully executed multiply operation to completion unit 150, as per block 460. Completion unit 150 stores the product result in an appropriate register (not shown) of processor 100.

In the case above, in decision block 415 detector 145 found no low latency "add" instruction that is both dependent on, and destructive of, a previously fetched high latency "mullw" instruction. Assume now however that decision block 415 detects a low latency "add" instruction that is both dependent on, and destructive of, a previously fetched high latency "mullw" instruction. In this event, instruction queue 135 sends the detected low latency "add" instruction via delay block 450 to N+1 CSA tree 210 for inclusion as one of the add operations that CSA tree 210 performs while executing the high latency "mullw" multiply instruction. Without such an "add" instruction to insert, N+1 CSA tree would perform N add operations to execute the high latency "mullw" multiply instruction. However, in the present case with such a low latency "add" instruction present, N+1 CSA tree 210 performs N+1 add operations in the course of executing the "mullw" multiply instruction. As seen in FIG. 2, bypass path 215 provides the additional low latency "add" instruction to an additional input 210A of N+1 CSA tree, thus enabling N+1 CSA tree 210 to inject the "add" instruction into the N adds that N+1 CSA tree 210 performs to execute the high latency "mullw" instruction. N+1 CSA tree 210 thus effectively fuses the low latency "add" instruction with the corresponding high latency "mullw" instruction on which it depends. Carry propagate adder 220 adds the intermediate results that it receives from N+1 CSA tree 210, as per block 455, thus generating the product result of the multiply operation. Carry propagate adder 220 sends the product result to completion unit 150, as per block 460. Completion unit 150 stores the product result in an appropriate register in processor 100. In the process flow described above in the flowchart of FIG. 4, issue queue 125 of FIG. 1 performs the functions that blocks 410, 415, 417, 420 and 435 describe.

Figure 5:
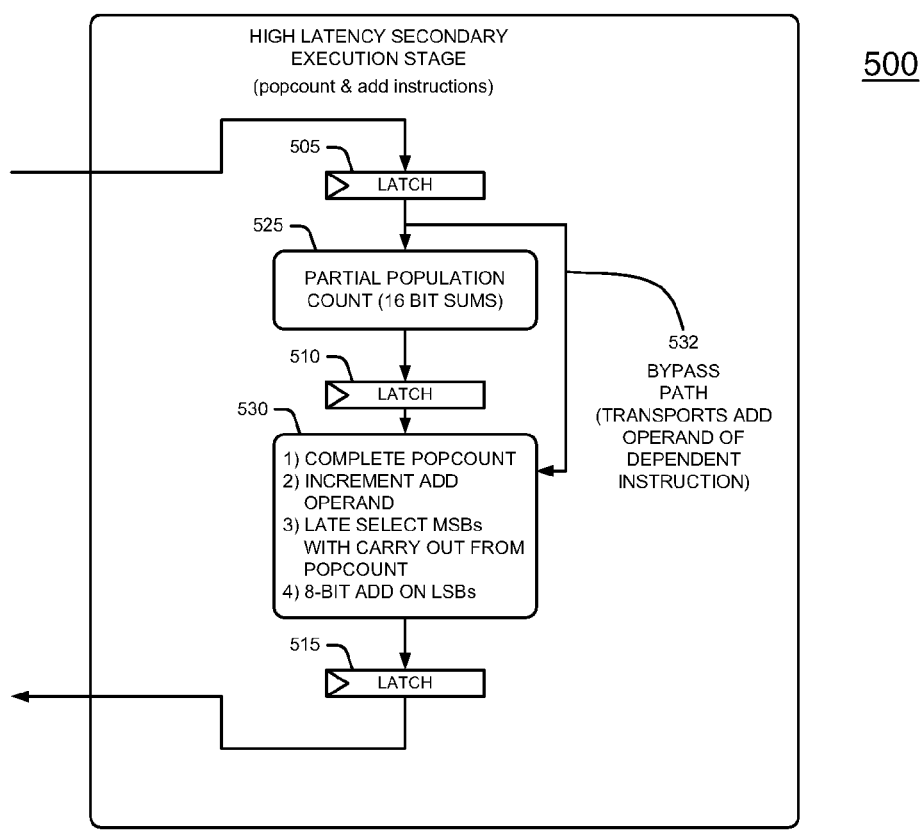
FIG. 5 shows a block diagram of another representative high latency secondary execution stage or pipeline that the disclosed processor may employ.

While the above discussion describes the operation of processor 100 when processor 100 encounters a high latency "mullw" multiply instruction and a corresponding dependent destructive low latency "add" instruction, processor 100 may also handle other high latency instructions and corresponding low latency instructions that are dependent on, and destructive of, a high latency instruction. For example, processor 100 may handle a high latency population count ("popcount") instruction and a corresponding low latency "add" instruction that is dependent on, and destructive of, the high latency "popcount" instruction. To accommodate such instructions, processor 100 employs a high latency secondary execution stage 500 as shown in FIG. 5 in addition to, or instead of, high latency secondary execution stage 200 of FIG. 1. A "popcount" instruction effectively looks at the contents of a particular register and provides a result that indicates the number of logic one bits in that register.

High latency secondary execution stage 500 of FIG. 5 includes latch stages 505, 510 and 520 at the clock boundaries of the pipeline stages thereof. Latch stage 505 couples to a partial population count stage 525. Partial population count stage 525 generates a partial population count of the logic 1's in a particular register, r5, for example. Latch stage 510 receives the partial population count from partial population counter stage 525 and provides the partial population count to the complete population count and increment the add operand stage 530. A bypass path 532, similar to bypass path 215, supplies a low latency "add" instruction to stage 530 so that stage 530 may include that add operation along with other add operations that stage 530 conducts. In this manner, stage 530 fuses the low latency "add"instruction to the high latency "popcount" instruction. Stage 530 performs a late select most significant bit (MSB) with carry out from popcount operation. Stage 530 provides a completed population count result to latch stage 515. Latch stage 520 sends the result to latch stage 112 and completion unit 150 of FIG. 1. Completion unit 150 sends the result to the appropriate register in processor 100, for example register r5. Fusing the dependent destructive add instruction with the multiply instruction as described above allows stage 530 to perform the add operation as an 8-bit add instead of a 64 bit add. This provides faster execution and elimination of a pipe stage in high latency secondary execution stage.

Figure 6:
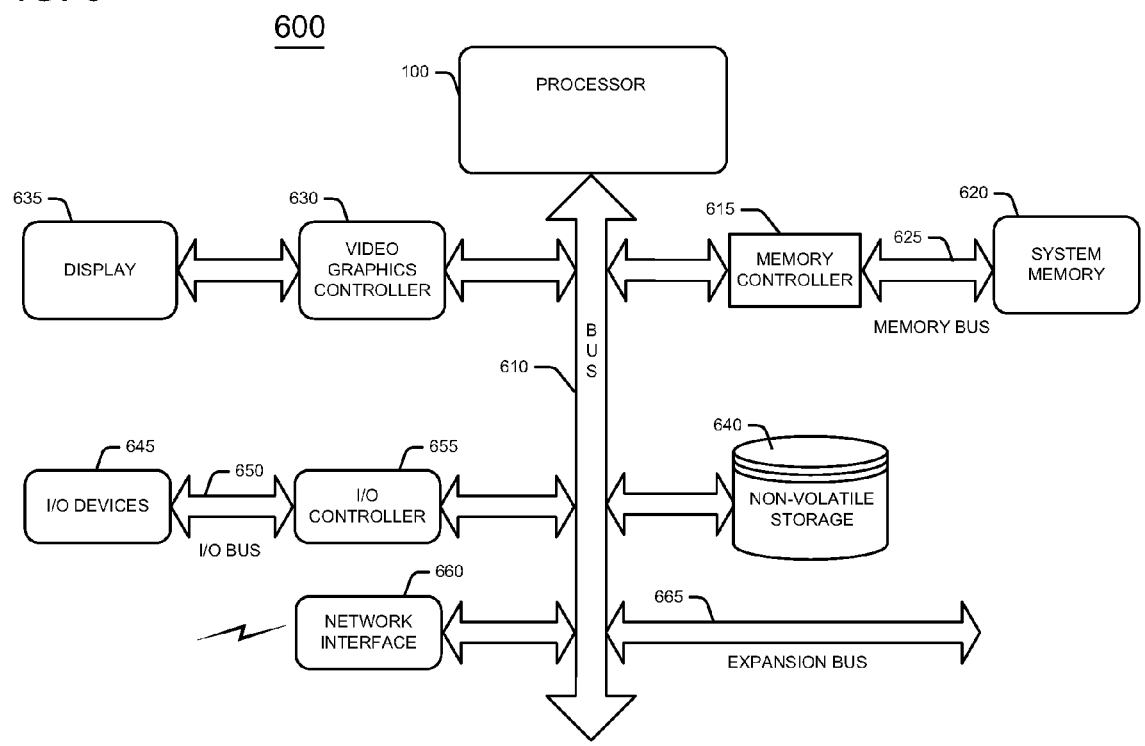
FIG. 6 is a block diagram of an information handling system (IHS) that employs the disclosed processor.

FIG. 6 is a block diagram of an information handling system (IHS) 600 that may employ processor 100 to handle high latency instructions and corresponding low latency instructions that depend on, and are destructive of, high latency instructions. IHS 600 includes a processor 100 that couples to a bus 610. A memory controller 615 couples system memory 620 to bus 610 via a memory bus 625. A video graphics controller 630 couples display 635 to bus 610. IHS 600 includes nonvolatile storage 640, such as a hard disk drive, CD drive, DVD drive, or other nonvolatile storage that couples to bus 610 to provide IHS 600 with permanent storage of information. Nonvolatile storage 640 is a form of data store. An operating system (OS) loads from nonvolatile storage 640 to memory 620 to govern the operation of client IHS 600. I/O devices 645, such as a keyboard and a mouse pointing device, couple via I/O bus 650 and I/O controller 655 to bus 610. One or more expansion busses 665, such as USB, IEEE 1394 bus, ATA, SATA, PCI, PCIE and other busses, couple to bus 610 to facilitate the connection of peripherals and devices to IHS 600. A network interface 660 couples to bus 610 to enable IHS 600 to connect by wire or wirelessly to a network and other IHSs. IHS 600 may take many forms. For example, IHS 600 may take the form of a desktop, server, portable, laptop, notebook, or other form factor computer or data processing system. IHS 600 may also take other form factors such as a personal digital assistant (PDA), a gaming device, a portable telephone device, a communication device or other devices that include a processor and memory.

The foregoing discloses a processor and processer methodology that in one embodiment provides the dynamic fusing of a low latency instruction with a corresponding high latency instruction in a high latency secondary execution stage. The teachings herein apply to both in order and out of order processors. In one embodiment, the disclosed processor and processor methodology may achieve performance improvement for existing code without adding new instructions to the instruction set of the processor.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of processing an instruction stream, comprising:
    fetching, by a fetch stage, a stream of instructions from an instruction source, thus providing a fetched stream of instructions;
    decoding, by a decoder, the fetched stream of instructions, thus providing a decoded stream of instructions;
    detecting, by a detector, a first latency instruction in the decoded stream of instructions followed by a second latency instruction, the second latency instruction exhibiting a latency less than the first latency instruction exhibits, the detector detecting if the second latency instruction is dependent on the first latency instruction and destructive of a result of the first latency instruction;
    dynamically fusing, subsequent to the detecting step, the second latency instruction with the first latency instruction to execute the second latency instruction with the first latency instruction if the detector detects that the second latency instruction is dependent on the first latency instruction and is destructive of the result of the first latency instruction, the dynamic fusing being performed during execution of the second latency instruction and the first latency instruction;
    sending, by an issue queue, the first latency instruction to a secondary execution stage, the secondary execution stage exhibiting a latency greater than a primary execution stage;
    sending, by the issue queue, the second latency instruction to the primary execution stage if the detector determines that the second latency instruction is not dependent on, or is not destructive of, the first latency instruction; and
    sending, by the issue queue, the second latency instruction to the secondary execution stage for dynamic fusing with the first latency instruction during execution if the detector determines that the second latency instruction is dependent on, and destructive of, the first latency instruction.

2. The method of claim 1, wherein the first latency instruction is a multiply instruction and the second latency instruction is an add instruction.

3. The method of claim 2, wherein the dynamic fusing step includes executing the multiply instruction as a plurality of add operations and executing the add instruction together with the plurality of add operations to yield a result.

4. The method of claim 1, wherein the first latency instruction is a population count instruction and the second latency instruction is an add instruction.

5. A processor comprising:
    a fetch stage that fetches a stream of instructions from an instruction source, thus providing a fetched stream of instructions;
    a decoder stage, coupled to the fetch stage, that decodes the fetched stream of instructions, thus providing a decoded stream of instructions;
    a detector, responsive to the decoded stream of instructions, that detects a first latency instruction in the decoded stream of instructions followed by a second latency instruction, the second latency instruction exhibiting a latency less than the first latency instruction exhibits, the detector detecting if the second latency instruction is dependent on the first latency instruction and destructive of a result of the first latency instruction;
    an execution stage, that executes the first latency instruction and the second latency instruction, the execution stage dynamically fusing the second latency instruction with the first latency instruction to execute the second latency instruction with the first latency instruction if the detector detects that the second latency instruction is dependent on the first latency instruction and is destructive of the result of the first latency instruction, the dynamic fusing being performed during execution of the second latency instruction and the first latency instruction;
    an issue queue, coupled to the decoder stage, that issues the first latency instruction and the second latency instruction to the execution stage;
    the execution stage including a primary execution stage, wherein the issue queue sends the second latency instruction to the primary execution stage if the detector determines that the second latency instruction is not dependent on, or is not destructive of, the first latency instruction; and
    the execution stage includes a secondary execution stage, wherein the issue queue sends the first latency instruction to the secondary execution stage, the secondary execution stage exhibiting a latency greater than the primary execution stage, wherein the issue queue sends the second latency instruction to the secondary execution stage for dynamic fusing with the first latency instruction during execution if the detector determines that the second latency instruction is dependent on, and destructive of, the first latency instruction.

6. The processor of claim 5, wherein the first latency instruction is a multiply instruction and the second latency instruction is an add instruction.

7. The processor of claim 6, wherein the secondary execution stage dynamically fuses the multiply instruction with the add instruction by executing the multiply instruction as a plurality of add operations and executing the add instruction together with the plurality of add operations to yield a result.

8. The processor of claim 5, wherein the first latency instruction is a population count instruction and the second latency instruction is an add instruction.

9. An information handling system (IHS) comprising:
a memory,
a processor, coupled to the memory, the processor including
a fetch stage that fetches a stream of instructions from an instruction source, thus providing a fetched stream of instructions;
a decoder stage, coupled to the fetch stage, that decodes the fetched stream of instructions, thus providing a decoded stream of instructions;
a detector, responsive to the decoded stream of instructions, that detects a first latency instruction in the decoded stream of instructions followed by a second latency instruction, the second latency instruction exhibiting a latency less than the first latency instruction exhibits, the detector detecting if the second latency instruction is dependent on the first latency instruction and destructive of a result of the first latency instruction;
an execution stage, that executes the first latency instruction and the second latency instruction, the execution stage dynamically fusing the second latency instruction with the first latency instruction to execute the second latency instruction with the first latency instruction if the detector detects that the second latency instruction is dependent on the first latency instruction and is destructive of the result of the first latency instruction, the dynamic fusing being performed during execution of the second latency instruction and the first latency instruction;
an issue queue, coupled to the decoder stage, that issues the first latency instruction and the second latency instruction to the execution stage;
the execution stage including a primary execution stage, wherein the issue queue sends the second latency instruction to the primary execution stage if the detector determines that the second latency instruction is not dependent on, or is not destructive of, the first latency instruction; and
the execution stage includes a secondary execution stage, wherein the issue queue sends the first latency instruction to the secondary execution stage, the secondary execution stage exhibiting a latency greater than the primary execution stage, wherein the issue queue sends the second latency instruction to the secondary execution stage for dynamic fusing with the first latency instruction during execution if the detector determines that the second latency instruction is dependent on, and destructive of, the first latency instruction.

10. The IHS of claim 9, wherein the first latency instruction is a multiply instruction and the second latency instruction is an add instruction.

11. The IHS of claim 10, wherein the secondary execution stage dynamically fuses the multiply instruction with the add instruction by executing the multiply instruction as a plurality of add operations and executing the add instruction together with the plurality of add operations to yield a result.

12. The IHS of claim 9, wherein the first latency instruction is a population count instruction and the second latency instruction is an add instruction.

\* \* \* \* \*